United States Patent [19]

Tomczuk et al.

[11] 4,011,372
[45] Mar. 8, 1977

[54] METHOD OF PREPARING A NEGATIVE ELECTRODE INCLUDING LITHIUM ALLOY FOR USE WITHIN A SECONDARY ELECTROCHEMICAL CELL

[75] Inventors: Zygmunt Tomczuk, Palos Hills; Theodore W. Olszanski, Roselle; James E. Battles, Oak Forest, all of Ill.

[73] Assignee: The United States of America as represented by the United States Energy Research and Development Administration, Washington, D.C.

[22] Filed: Dec. 9, 1975

[21] Appl. No.: 639,133

[52] U.S. Cl. .............................. 429/218; 429/235; 75/134 A
[51] Int. Cl.² ......................................... H01M 4/40
[58] Field of Search ................ 136/6 F, 6 FS, 6 R, 136/20, 83 R, 100 R, 75, 67, 120 R; 429/218, 235; 75/134 A, 134 S, 135, 138, 134 R

[56] References Cited

UNITED STATES PATENTS

| | | | |
|---|---|---|---|
| 3,881,951 | 5/1975 | McCoy | 136/20 |
| 3,933,520 | 1/1976 | Gay et al. | 136/6 LF |

*Primary Examiner*—Anthony Skapars
*Attorney, Agent, or Firm*—Dean E. Carlson; Arthur A. Churm; Hugh W. Glenn

[57] ABSTRACT

A negative electrode that includes a lithium alloy as active material is prepared by briefly submerging a porous, electrically conductive substrate within a melt of the alloy. Prior to solidification, excess melt can be removed by vibrating or otherwise manipulating the filled substrate to expose interstitial surfaces. Electrodes of such as solid lithium-aluminum filled within a substrate of metal foam are provided.

10 Claims, 1 Drawing Figure

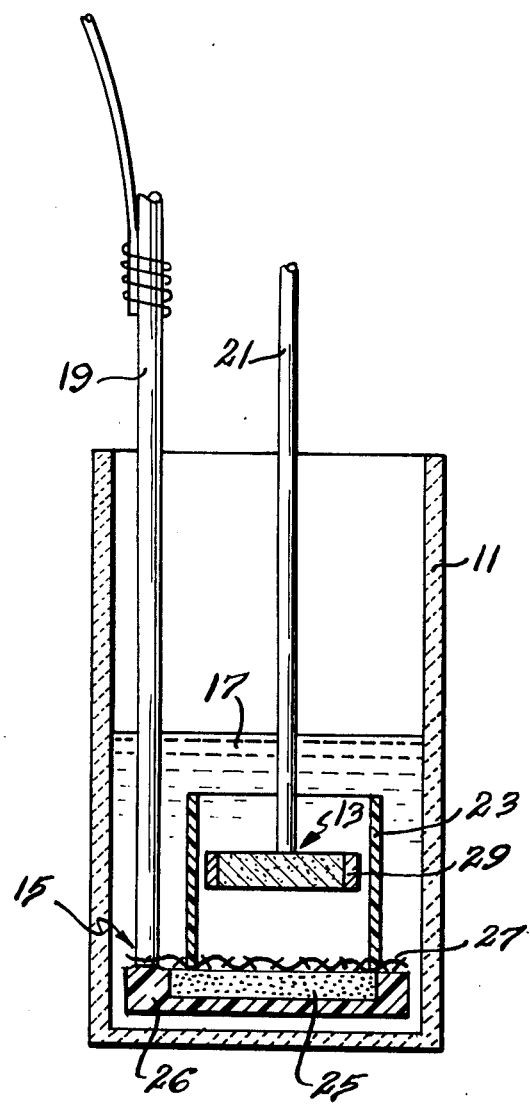

METHOD OF PREPARING A NEGATIVE ELECTRODE INCLUDING LITHIUM ALLOY FOR USE WITHIN A SECONDARY ELECTROCHEMICAL CELL

CONTRACTUAL ORIGIN OF THE INVENTION

The invention described herein was made in the course of, or under, a contract with the United States Energy Research and Development Administration.

BACKGROUND OF THE INVENTION

This invention relates to negative electrodes and their preparation. It particularly relates to methods of preparing electrodes which employ solid lithium-aluminum Alloys as active material. Electrochemical cells using electrodes of this type are being developed to provide high current and capacity densities, high specific power and long cycle life. Such cells have application in batteries for powering an electric vehicle or for the storage of electric power generated by electric utilities during periods of off-peak usage.

A substantial amount of work has been done in the development of electrodes that employ solid alloys of alkali metals or alkaline earth metals. Of these, lithium and calcium alloys have received the most attention as negative electrode active materials. Secondary electrochemical cells having high specific energy and capacity can be prepared from these negative electrodes opposite to positive electrodes includng chalcogens or metal chalcogenides as active materials. For example, sulfides of the transition metals are particularly well suited as positive electrode reactants.

Examples of such secondary electrochemical cells and their various components are disclosed in U.S. Pat. Nos. 3,716,409 to Cairns et al., entitled "Cathods for Secondary Electrochemical Power-Producing Cells", Feb. 13, 1973; 3,887,396 to Walsh et al., June 3, 1975, entitled "Modular Electrochemical Cell"; and 3,907,589 to Gay et al., Sept. 23, 1975, entitled "Cathode for a Secondary Electrochemical Cell". In addition, various methods of preparing electrodes are illustrated in U.S. patent application Ser. Nos. 481,285 to Settle et al., filed June 20, 1974 now U.S. Pat. No. 3,957,532, May 18, 1976, and 565,021 to Gay et al., filed Apr. 3, 1975 now U.S. Pat. No. 3,933,520, Jan. 20, 1976. Each of these patents and patent applications are assigned to the assignee of the present application.

Negative electrodes employing lithium-aluminum active material have previously been prepared either by electrochemical processes or by alloying the two elements at temperatures above the liquidus. In electrochemically depositing lithium metal into an aluminum substrate, a number of lengthy electrochemical cycles are often required. Care must be taken in the cycling to maintain uniform deposition and sufficient porosity within the substrate.

Lithium-aluminum alloys prepared from molten mixtures of the two elements have been solidified and annealed to enhance uniformity. The resulting solid alloys were comminuted to particles and either vibratorily loaded into an electrically conductive, porous structure or hot-pressed with molten electrolyte into moldes containing current collector structures to form electrodes. Handling active material in powdered form involves the risk of contamination. These techniques also are difficult to adapt to large production rates, as they require close control to attain uniformity in porosity and distribution of active materials. The electrodes undergo redistribution or slumping of the active materials during operation within an electrochemical cell.

The inventors, being aware of these prior art problems, have as objects of their invention an uncomplicated method that can be performed in a short time for preparing porous lithium alloy electrodes with electrically conductive current collectors.

It is also an object to provide a method that permits easy control of electrode porosity and active material loading.

It is a further object to provide an improved negative electrode containing a solid lithium alloy for use within a secondary electrochemical cell.

SUMMARY OF THE INVENTION

In accordance with the present invention, a method of preparing a negative electrode including lithium alloy as active material within a secondary electrochemical cell is disclosed. A melt of lithium alloy containing the desired composition is prepared. A porous substrate of electrically conductive metal is immersed into the melt and removed to solidfy adherent alloy within at least a portion of its void volume. Excess alloy can be removed prior to solidification by shaking, vibrating or otherwise manipulating the filled substrate.

BRIEF DESCRIPTION OF THE DRAWING

The drawing shows a schematic in elevation and cross section of an electrochemical cell used in testing the electrode of the present invention.

DETAILED DESCRIPTION OF THE PREFERRED EMBODIMENT

In the FIGURE, an experimental electrochemical cell is shown contained within a ceramic crucible 11. The cell includes a negative electrode 13, a positive electrode 15, both submerged within a molten electrolytic salt 17. Electrical conductors 19 and 21 extend from the positive and negative electrodes, respectively, for connection to electrical instrumentation (not shown) for evaluating the cell.

In practice, various cell designs may be used with electrodes produced by the improved method of the present invention. The cell of the figure merely represents an example of the type cell used experimentally to test and prove operability. Other cell designs which may be more suitable for use in making up electrochemical batteries are illustrated and described in U.S. Pat. No. 3,887,396 and U.S. patent application Ser. No. 565,021, both cited above.

The positive electrode 15 is illustrated as a covered structure with a central chamber fore containing the cathode reactant composition 25. The structure is illustrated as a graphite cup 26 covered with a wetted porous carbon cloth 27 that permits permeation of the molten electrolyte.

The electrolyte 17 that surrounds the two electrodes can be a eutectic salt composition that is molten at the cell operating temperatures of, for instance, 375° to 500° C. Electrolytes such as compositions of LiCl—KCl or LiCl—LiF—KBr salt have been found to be suitable in this application. Various other suitable electrolytes can be selected from those listed in U.S. Pat. No. 3,488,221.

Negative electrode 13 is illustrated surrounded by a cylinder of electrically insulative material 23 such as alumina or beryllia. Sleeve 23 prevents shorting of the cell through any loose electrode materials that may have escaped during operation. The negative electrode is shown mechanically fastened to conductor 21. Of course, various other suitable techniques such as soldering or unitary fabrication can be employed in attaching the cell electrical conductor to the electrode. Also shown is a structural support ring 29 that can be used where electrode substrates of high porosity and low strength are employed.

In practicing the method of the present invention, an electrically conductive substrate having porosity or perforations is immersed in a melt of lithium alloy. The substrate is removed from he melt and the alloy solidified within the interstitial void volume of the substrate. Solidification can be achieved in an inert gas atmosphere, e.g. He or Ar, at a reduced temperature to provide an electrode structure. It is to be understood that molten lithium alloy such as molten lithium-aluminum will attack various metals including iron that may otherwise be suitable for substrate use. Therefore, it is of importance that contact time and temperature of the metal substrate and the molten alloy be minimized. For this reason thick castings of lithium alloy are disadvantageous as electrode structures. The preferred method minimizes substrate contact with molten alloy and provides a porous substrate with substantially all of the lithium alloy solidifed as adherent melt within its void volume.

In a preferred procedure, the substrate is briefly dipped for no more than about 1.0 to 15 seconds within a melt of the alloy at about 10° to 50° C. above liquidus temperature and subsequently removed with adherent molten alloy. Before the alloy solidifies at temperatures below the liquidus, the substrate is shaken, vibrated or otherwise manipulated to remove excess molten alloy and thereby regain a portion of the substrate porosity within the completed electrode. This procedure serves to expose interstitial surfaces of lithium alloy to the cell electrolyte and thereby provide increased sites and surface area for electrochemical reaction.

Various lithium alloy compositions can be employed in the present method. Alloys of lithium with several elements from groups IIA, IIIA and IVA of the periodic table have sufficiently high melting points to permit their use as solid active material in cells operated with molten salt electrolytes. Of these alloys, lithium-aluminum has thus far appeared the most promising. From the phase diagram of the lithium-aluminum system presented in U.S. Pat. No. 3,957,532, cited above, it can be seen that alloy compositions containing up to 60 atom percent lithium exist as completely solid phases at temperatures up to 522° C. At lithium concentrations below 50 atom percent, the lithium-aluminum system includes only solid phases at temperatures below about 600° C. These solid phases include the intermetallic compound $Li_3Al_2$, the beta phase of about equal atom parts lithium and aluminum and the alpha phase of lithium solute dissolved in aluminum solvent. In order to provide sufficient lithium as reactant within the electrode material to achieve sufficient capacity per unit electrode weight, it is contemplated that between 30 and 60 atom percent lithium will be employed in the fully charged electrode. However, an electrochemical cell can be assembled in a discharged or partially discharged state, for example, as is described in U.S. Pat. No. 3,947,291 to Yao et al. In such a cell about 6 to 7 atom percent lithium can be provided in the negative electrode and sufficient lithium salt, e.g. $Li_2S$, can be provided in the positive electrode to permit charging to a sufficiently high lithium concentration in the negative electrode. Therefore the method and electrodes of the present invention contemplate lithium concentrations of about 6 to 60 atom percent.

Alloys other than lithium-aluminum that may be used include lithium-silicon and lithium-magnesium. The lithium-silicon system can include about 30 to 80 atom percent lithium and can be prepared from a melt of about 650°–700° C. while the lithium-magnesium system can include up to about 50 atom percent lithium and be prepared from a melt of about 600° to 650° C. In some applications ternary alloys of lithium-aluminum-silicon, lithium-aluminum-boron or lithium-aluminum and other elements within groups IIA, IIIA and IVA of the periodic table can be employed.

The porous substrate employed can be of various electrically conductive metals including Fe, Ni, Mo, Cr and Nb. Nickel-base alloys, including nickel-chromium alloys, iron-nickel-chromium-molybdenum alloys and other high nickel alloys such as Incoloy and the austenitic stainless steels, also can be used. The materials selected are preferably those which are not highly reactive with the molten lithium alloy and are fairly wetted by the molten alloy at elevated temperatures.

The substrate structure can be of various forms. Single layers or stacks of layers of metal screen, mesh, perforate sheets are examples of substrates that can be employed. In addition, porous compacts of fibrous or particulate material may be suitable. Included among these are felts and wools of steel, nickel and various alloys. A preferred substrate is that of the high-porosity, low-density metal foams, e.g. with 90–99% porosity and 600 to 800 micrometers openings. A number of metal foams are commercially available under the trademarks Retimet and Foametal.

The following examples are presented to more clearly illustrate the method of the present invention.

EXAMPLE I (Cell Li-Al/FeS No. 1)

Two foamed nickel discs of about 96% porosity with about 800 micrometer pore size were immersed for about 15 seconds within a tantalum crucible containing 40 atom % lithium and 60 atom % aluminum as molten alloy at about 700° C. The substrate was removed and gently shaken manually within a helium gas atmosphere of about 20° to 30° C. Because of surface tension effects the liquid alloy more or less completely filled the foamed metal structure and only an estimated 5 to 10% of the porosity was regained prior to solidification of the alloy. The two discs filled with solid lithium-aluminum alloy were assembled as a two-layered negative electrode within a cell configuration similar to that shown in the figure. Other characteristics of the cell are shown in Table I.

TABLE I

| Physical Characteristics of Cell Li-Al/FeS (No. 1) | |
|---|---|
| Positive Electrode | |
| Area, cm² | 4.8 |
| Active material | FeS |
| Weight of active material, g | 0.81 |
| Theoretical capacity, A-hr | 0.5 |
| Theoretical capacity density, A-hr/cm² | 0.1 |
| Current collector | none |
| Negative Electrode | |
| Area, cm² | 3.1 |
| Weight of Li-Al, g | ~2.4 |
| Current collector | Ni foam |

TABLE I-continued

Physical Characteristics of Cell Li-Al/FeS (No. 1)

| Positive Electrode | |
|---|---|
| Theoretical capacity, A-hr | ~1.3 |
| Other Characteristics | |
| Weight of electrolyte (LiCl-KCl), g | 127 |
| Interelectrode distance, cm | ~1 |
| Operating temperature, °C. | 440 |

The cell was operated for 21 discharge-charge cycles and about 300 hours at current densities varying from 20 to 30 mA/cm$^2$ (based on the negative electrode area) before it was voluntarily terminated. Cutoff voltages of about 1.0 on discharge and 1.8 on charge were employed. After about the seventh or eighth cycle, cell capacities of about 0.5 A-hrs were obtained enough through the remainder of the test with a charge to discharge current efficiency of in excess of 99%. Somewhat lower capacities during the first five or six cycles are attributed to the later development of additional porosity within the negative electrode.

EXAMPLE II

A negative electrode was prepared in essentially the same manner as in Example I except that the nickel foam was immersed in the lithium-aluminum melt for only about 5 seconds and was vigorously shaken after removal until a porosity of about 70% was obtained.

EXAMPLE III

As a proposed alternative to the negative electrode in Example I, the nickel foam is immersed for about 1 second in a melt of about 6 atom percent lithium and 94 atom percent aluminum at about 680° C. It is then withdrawn and manipulated to remove excess melt before solidification occurs. The resulting electrode structure is assembled as a negative electrode within an electromchemical cell having a positive electrode containing Li$_2$S and iron. This cell is charged to a sufficient cutoff of about 2.2 volts to provide FeS$_2$ in the positive electrode and about 50 atom percent lithium and 50 atom percent aluminum as solid alloy in the negative electrode.

It can be seen from the foregoing description and examples that the present invention provides an improved method of preparing a negative electrode. The method permits uniform and controlled loading of lithium-aluminum alloy into a porous current collector structure. Porosity and loading of the substrate can be conveniently controlled by manipulating or shaking the substrate after immersing it within molten lithium-aluminum alloy.

The embodiments of the invention in which an exclusive property or privilege is claimed are defined as follows:

1. A method of preparing an electrode including a lithium alloy as active material for use as a negative electrode within a secondary electrochemical cell, said cell also including a positive electrode and a molten salt electrolyte, said method comprising preparing a melt of lithium alloy selected from the group of lithium-aluminum, lithium-silicon and lithium-magnesium; immersing a porous substrate of electrically conducting metal within said melt; removing said substrate from said melt to completely solidify adherent lithium alloy within at least a portion of the void volume of said substrate; and assembling said substrating with completely solidified lithium alloy within said electrochemical cell.

2. The method of claim 1 wherein said porous substrate is dipped within a melt of lithium-aluminum alloy for about 1.0 to 15 seconds and subsequently removed for cooling to below the solidus temperature of said alloy.

3. The method of claim 1 wherein said porous substrate is removed from said melt and shaken to remove excess alloy prior to solidification.

4. The method of claim 1 wherein said melt comprises about 6 to 60 atom percent lithium and about 94 to 40 atom percent aluminum and is at about 10° to 50° C. above liquidus temperature while said substrate is submerged therein.

5. The method of claim 1 wherein said porous substrate includes apertures and interstices of about 600 to 800 micrometers opening and a porosity of about 90 to 99 percent.

6. An electrode prepared by the method of claim 1.

7. An improved negative electrode within a secondary electrochemical cell also including a positive electrode and a molten salt electrolyte, said negative electrode comprising a completely solid lithium alloy of lithium and another element selected from the group consisting of aluminum, silicon, and magnesium and a porous substrate of electrically conductive metal, said substrate having at least a portion of its void volume filled with adherent, solidified melt of said lithium alloy.

8. The negative electrode of claim 7 wherein said alloy comprises lithium and aluminum with 6 to 60 atom percent lithium.

9. The negative electrode of claim 7 wherein said metal substrate includes a porosity of 90 to 99% void volume and includes a sufficient filling or lithium alloy to provide an electrode porosity of about 10 to 70%.

10. The negative electrode of claim 7 wherein substantially all of said lithium alloy within said electrode is contained within the void volume of said substrate.

* * * * *